United States Patent [19]

Stanzcyk

[11] Patent Number: 5,250,946
[45] Date of Patent: Oct. 5, 1993

[54] DEVICE FOR ESTIMATING THE BEHAVIOR OF ROAD-USERS

[75] Inventor: Daniel Stanzcyk, Jarny, France

[73] Assignee: Centre d'Etudes Techniques de l'Equipment de l'Est Service Exterieur de l'etat, Metz Cedex, France

[21] Appl. No.: 778,187
[22] PCT Filed: Jun. 26, 1990
[86] PCT No.: PCT/FR90/00470
   § 371 Date: Feb. 10, 1992
   § 102(e) Date: Feb. 10, 1992
[87] PCT Pub. No.: WO91/00581
   PCT Pub. Date: Jan. 10, 1991

[30] Foreign Application Priority Data

Jun. 26, 1989 [FR] France .............................. 89 08662

[51] Int. Cl.⁵ .................................................. G08G 1/01
[52] U.S. Cl. .................................... 340/936; 340/937; 364/437; 364/438
[58] Field of Search .............. 340/936, 937, 933, 928; 377/9; 364/437, 438; 342/115

[56] References Cited

U.S. PATENT DOCUMENTS

| | | | |
|---|---|---|---|
| Re. 29,401 | 9/1977 | Aker et al. | 342/115 |
| 3,626,413 | 12/1971 | Zachmann | 364/437 |
| 3,978,321 | 8/1976 | Doggett | 340/933 |
| 4,173,010 | 10/1979 | Hoffmann | 340/936 |
| 4,201,908 | 5/1980 | Johnson et al. | 377/9 |
| 4,265,419 | 5/1981 | Scorteanu | 377/9 |
| 4,385,227 | 5/1983 | Bridges | 377/9 |
| 4,866,438 | 9/1989 | Knisch | 340/937 |
| 4,988,994 | 1/1991 | Loeven | 340/936 |
| 5,041,828 | 8/1991 | Loeven | 340/936 |

*Primary Examiner*—John K. Peng
*Assistant Examiner*—Nina Tong
*Attorney, Agent, or Firm*—Matthew K. Ryan

[57] ABSTRACT

A device for estimating the general behavior of a group of persons, each person being the driver of a moving body. The invention relates to a device estimating comparatively the behaviors by measuring the average speeds of a same group or more generally of different groups in one location or at different locations. The device is comprised of a casing concealable inside an envelope including a display unit programmable by the threshold of the selected speed, and alternatively, two counters, one indicating the number of moving bodies exceeding the threshold value and the other counter indicating the total number of moving bodies. The components are a Doppler sensor, an amplification stage, a logic stage for the control of the counters, and a power source (i.e. batteries). The invention relates to a device and method for the measurement of average speeds of road users in relation to traffic security, to the measurement of average speeds of athletes with or without mechanical equipment, and to the measurement of instantaneous speeds, of lengths of the bodies and to their classification in relation to rolling bodies on roads.

8 Claims, 2 Drawing Sheets

DEVICE FOR ESTIMATING THE BEHAVIOR OF ROAD-USERS

FIELD OF THE INVENTION

The present invention concerns a device called VI-ETEST, registered trade mark, its use and applications for estimating tho influence of the environment on the behaviour of a number of persons and/or intelligent animals or conditions present or not on a body of moving body, by the measurement of the speed of the group, measured individually and sorted, preferably before and after a change in the environment.

BACKGROUND OF THE INVENTION

There exist apparatus in the field of traffic:
a speed measurer which with the aid of a Doppler effect captures the instantaneous and precise measurement of speed with the essential aim of its reduction
a measuring traffic station which shows with the aid of electromagnetic loops the average speed of a group of vehicles, the spread, the number of vehicles exceeding a speed threshold.

These materials are highly priced and inconvenient: for the first, FF50,000, and the cost of the case for the second, FF100,000, and the cost of the armour. Moreover, the procedure necessary with the second by the civil engineers costs about FF30,000 to Bet up for each measurement point.

OBJECTS

The device according to the invention offers a solution which is more practical, less inconvenient, faster in its operation, more sophisticated, economical.

DESCRIPTION OF THE PREFERRED EMBODIMENTS

The device comprises a case (1) housed in the inside of an artificial envelope, for example, attache case, bag, case preferably provided with a handle for transport, orientation, measurement while in motion or stationary or an outliner. According to a variation, the envelope is or simulates a natural element such as a stone, or the branch of a tree.

A programmable display (3) is fixed on the case to set the chosen speed threshold, two counters (4) and (5), one indicating the number of moving bodies exceeding the programmed speed threshold and the other preferably located underneath to indicate the total number of moving bodies, the reader of the two counters instantly provides a report for example 6/35 before adjustment; 2/52 after adjustment. That is to say the approximate reduction of 17% to 4% in the exceeding of the threshold which is shown by the active second adjustment indicates a significant slowing down of 17−4=13% in the sense of better safety.

It is significant that the difference in percentage is noteworthy in that it does not require d fine precision of measure on the one hand of reduction of the number of gaps, and on the hand a total obliteration of a one sided positional distortion.

Figure 1:
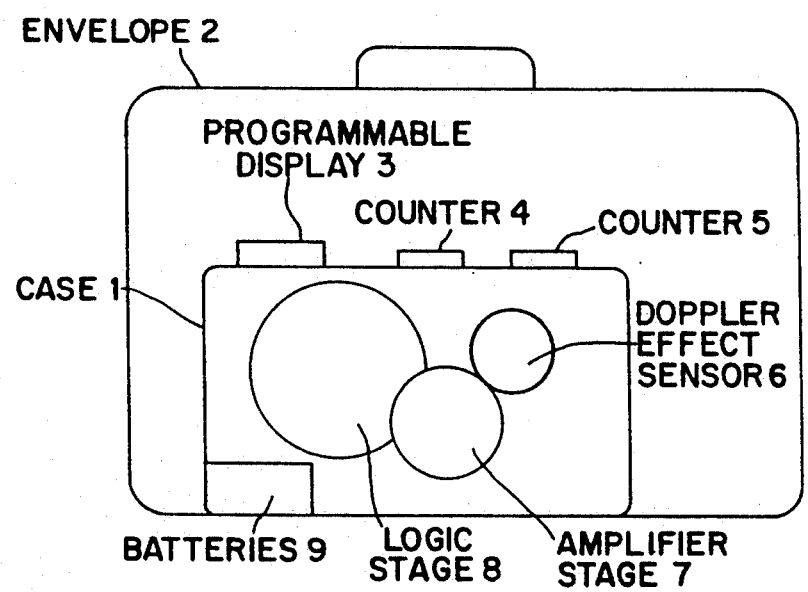
FIG. 1 is representative of the device
Figure 2:
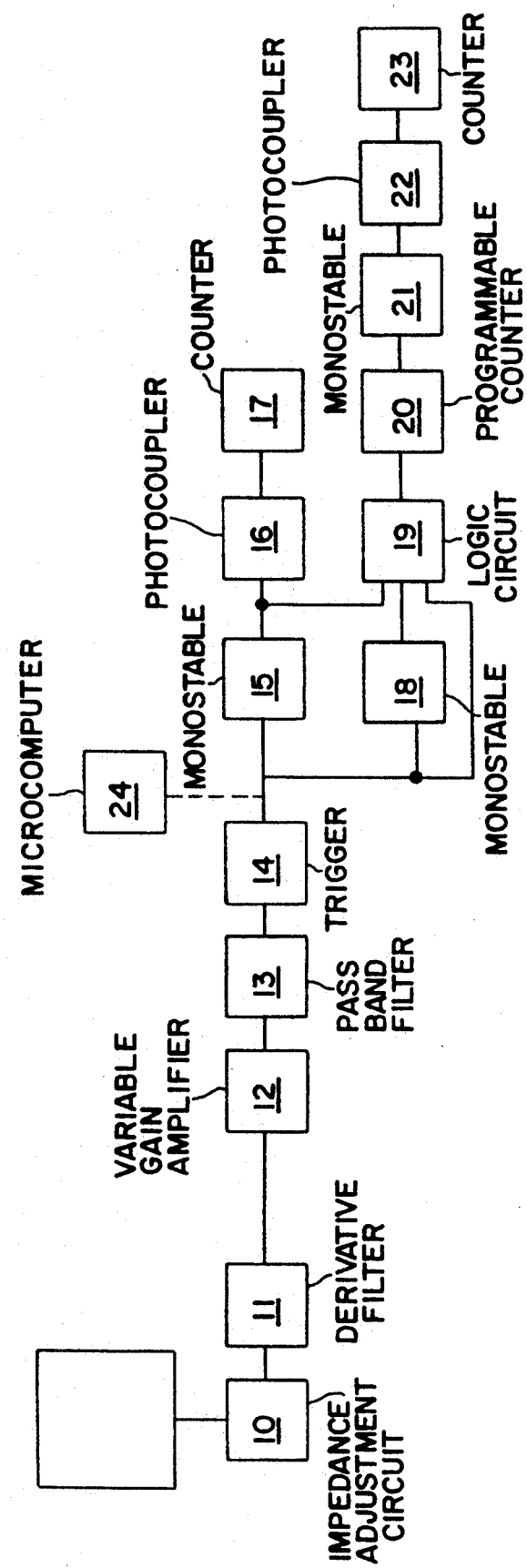
FIG. 2 is representative of the method

In the interior of the case are the electronic components for a Doppler effect sensor (6) or the like, an amplifier stage (7), d logic state (8) to control the counters and one or more calls or batteries (9). The sensor extends across the case and the envelope without the extra need of other items. The Doppler effect sensor delivers for every passage of movement of the body a signal of very low amplitude at d frequency which is proportional to the speed of movement of the body. This signal is applied (see FIG. 2) to an impedance adjustment circuit (10) followed by a derivative filter (11) to ensure elimination of components continuously delivered by the sensor.

A variable gain amplifier (12) increases the amplitude of the signal drawn from the pass band filter (13) the included band (100 Hz to 10000 Hz) ensuring an amplification of the useful signal. This signal is inverted by a n"trigger" (14) to a variable entry threshold and the purpose of providing a signal between 0V and 5V.

The device comprises an amplification part, The following signal is oriented opposite a state called "logic". It contains 3 things. They are an follows:
a monostable (15) which the voltage time peaks at the exit &re at 500 mg for example. The peaks are variable between 200 ms and 2s, dependant on the speed of the moving body at d given point. This represents the maximum passage of interval on the DOPPLER state. The signal in fed to a photocoupler P (16) which controls a counter 417) counting the total number of bodies
a monostable (18) in which the voltage time peaks are of constant duration, for example 30 ms. The duration of the intervals comprising the voltage peaks provides an amplification stage
a logic circuit (19) which ensures the passage of the voltage peaks of the amplification tart if the two monostables (15) and (18) are active.

These voltage peaks are oriented by a programmable counter (20) which is compatible and whose exit passes a base level or high level before the programme number is alternated. This number represents a speed threshold.

The signal is passed to a monostable (21) in which the exiting voltage peak is equivalent to the exiting peak of the monostable (15). This$ controls d photocoupler (22) which activates a counter (23) which counts the number of bodies exceeding the programmed speed limit. Before the DOPPLER signal is applied to the entry of the amplifier, the signal at the exit of the amplifier at (5) and forms d rectangular shape of frequency (y) proportional to the speed (x) according to the mathematical expression $$y - K \text{ x towards } X = Hz/km$$

The counter (17) counts a body which is the signal frequency. The counter (22) comprises a body if the signal frequency is greater than or equal to the programmed number of the programmable counter.

According to d variation of the device permits a measurement of speed, the preset intervals of the sensor which measures the instant speed, mean speed, body length, time present in front of the sensor. In this mode of operation, the amplification part is similar to the description above. The circuits 10, 11, 12, 13 and 14 are identical. The variations are in the following circuits.

The signal exiting from the amplifier (14) is supplied to two circuits.
a counter which records the total number of voltage peaks. This number is given by the passage of bodies which passed to & circuit and divided by 44.7. The number found after division is equal to the speed of the vehicle.

a counter which records the number of 1/10 ms between the appearance of the first peak given by the start of the detected body and the last peak given by the last of the same detected body.

The two numbers are fed to a multiplying circuit (V×t=e). The result at the exit of the circuit is the length of the vehicle is added to the length of the detecting beams.

the number is compared by means of a comparator circuit of a number equivalent to a length of 5 m for example. If it is less, a counter records the type of body counted, in the case where it is equal or larger, another counter records the body length.

This device at the exit of the amplifier (14) may be compared to a microcomputer.

The uses of the devices and the methods are very large, they concern all which move, in particular road users, which may be vehicle, a motorbike, a bicycle or by foot. They show the behaviour by reporting the physical situation and the physical environment and the mental state of an individual. It is foreseen that these will result in an increase in road safety. Other applications include sports activists, pedestrians, cyclists, skiers, the passage-of bands.

According to a variation of the device, a microcomputer associated with a sensor at the stage of amplification allows for such bodies, to calculates display, edit and store the speed of each body present, the interval between bodies, the length of the bodies.

The method for counting the number of bodies exceeding a speed threshold and the total number of bodies is characterised by comprising the following operational stages:

producing a signal; by means of a Doppler affect sensor which is representative of the speed of a body;

amplifying and filtering the signal provided by the sensor to provide a useful signal, for example a low level 0 V and high level 5 V, the frequency or number of pulses of which is proportional to the speed of a body;

counting the number of pulses within a window of predetermined time;

counting a body which exceeds the speed if the number of pulses exceeds the set number of pulses programmed using coding wheels or numerical inputs;

counting the total number of bodies independently of the speed at which they pass.

According to an extension of the method, it is possible to make the following measurements on each body: speed, body length, time present before the sensor, time between bodies, characterised in that when associated with a microcomputer it comprises the following operating stages:

delivery;

amplification, filtration;

counting the total number of voltage peaks caused by the passage of a body in front of the sensor;

dividing this number by the kilometric coefficient given by the manufacturer of the Doppler effect sensor, e.g. 44.7 Hz. The number found after division is the spa-ed of the body counting the number of 1/10 Ms between the appearance of the first peak given by the start of the body detected and the last peak given by the same body. This number represents the time for which the vehicle was present in front of the sensor;

counting the number of 1/10 ms between the appearance of the first peak caused by the passage of a first body and the first peak caused by the passage of a second body before the first along the same path. This number represents the time between bodies. The time is calculated for each vehicle;

multiplying the speed of the body by the time for which the body is present, from which the approximate width of the Doppler beam is subtracted. This distance represents the length of the bodies;

displaying the basic information listed above and storing it in memory. This information will be used to calculate the mean speed, the mean occupation time, the mean presence timer the mean length of d group of bodies and different classifications according to length, Speed or presence time criteria in the course of a significant period of time.

According to another variation of the device, the sensor (6) is positioned in the interior of the envelope (6) with a variable angle by resting on a slope and measuring the characteristics of the vehicles. The envelope is preferably positioned parallel to the axis of the slope, in the direction of its length, which is the best position for the sensor in the inside of the envelops. The measurements are preferably take place in advance of the vehicle before it comes to a stop.

The sensor is fed permanently or cyclically by a regulatable cycle. For example; it is fed during an interval of 10 ms every 100 ms in which there is no detection of movement. If movement is detected, the sensor is permanently fed, and if the vehicle actuates the sensor the supply is discontinued to limit consumption of the device.

The exit door and the receiver of the Doppler effect is controllable according to the size of the distances. For example the door of the effect is controllable by the action following the gain amplifier (12), FIG. 2 and also by a commutor is various positions: Examples 2 m, 5 in 5, 9 m, 12.50 m.

According to another extension of the method, in particular at the beginning of working or a vehicle which can be masked by another, preferably there are two devices placed sensibly one above the other along a unidirectional or bidirectinal route, or a slope or the curve, the devices preferably being oriented in divergent fashion for detecting their interactions. In this arrangement a single device may be used simply alone or with other sensors, and the devices may be provided with complementary equipment for their co-operation, relation; radio or infra red.

According to another variation the electromagnetic loop of the device is replaced by metrology in the field of roads, motorways, aeronautics and/or to reduce energy consumption, one or the device(s) are associated with other sensors such as piezoelectric, pneumatic tubes, electromagnetic loops etc. to establish instantly supply of the Doppler sensor and to register and measure the passage of a vehicle.

According to another variation the display (3) and the counters (4,5) are fixed and also all other commands or displays are transferable to a minishelf connected by a connecting link and mounted in a box (1), in a way to avoid opening the envelope and to reduce energy consumption.

The minishelf are advantageously secured by magnetic clips, velcro straps, etc. in the region of the envelope handle (2) to allow opening of the envelope and discreet movement and digitising of the buttons and the counters with one hand.

Another aspect which may be considered is radio or infra red simultaneous command of many devices in one or the same placer near or far or many more places 5 kilometres apart. In this case, the devices may be left for example in a car or house or rubbish bin or candelabra and the measured effects from the distance are very varied.

We claim:

1. Device for determining the proportion of traffic of moving bodies exceeding a speed threshold, the device comprising a case, the case comprising sensing means for providing a signal representative of the speed of a moving body and having a converting means to convert the sensed signal into a train of pulses which converting means adjusts the frequency of the pulses according to the speed of the sensed body and further having counting means for counting the number of pulses in a time period; and the case further comprising, mounted externally thereof, a means to indicate the number of moving bodies exceeding the threshold and a means to indicate the total number of moving bodies sensed, wherein the case contains:

a power source and a Doppler effect sensor, arranged to convey a sensed signal to an amplifier stage and thence to a counter control logic state, and then via an impedance adjustment circuit and derivative filter means, to a variable gain amplifier and a pass band filter; the signal then being conveyed to a trigger stage having a variable input arranged to supply a signal to a first monostable circuit which conveys a signal to a photocoupler controlling a counter to count the total number of bodies sensed, and a signal to a second monostable circuit to invert and to count the voltage peaks, the second circuit being connected to a logic circuit to convey the signal with inverted peaks to a program counter to count a value representing a predetermined speed threshold, and a signal to a third monostable circuit which controls a photocoupler arranged to activate a programmable counter to count those signals having a frequency equal to or greater than the programmed number in the counter therefor, thereby to count the number of moving bodies exceeding the speed threshold.

2. The device according to claim 1, wherein the case is concealed within a transportable envelope which is a natural object.

3. The device according to claim 2, wherein the envelope has a handle-like carrying means.

4. The device according to claim 2, wherein the envelope is selected from the group consisting of resembling a stone and part of a tree.

5. The device according to claim 1, wherein the display means to display the total number of moving bodies sensed is mounted below the display means to display the number of bodies exceeding the threshold.

6. The device according to claim 1, wherein the sensing means comprises a sensor arranged to operate by the Doppler effect and to produce a signal which is conveyed to an amplifier and filter to provide a higher or lower voltage signal the frequency of the pulses of which is proportional to the speed of the body, and wherein counter means are present to count the number of pulses in a time interval; and wherein counting means are present to count the number of bodies exceeding a predetermined threshold; and wherein counting means are present to count the total number of bodies sensed.

7. The device according to claim 1, further comprising a microcomputer determining from the sensed signal the body speed and body length and the time period for which a moving body was sensed; and the interval between sensed bodies.

8. The device according to claim 1, wherein the case is concealed within a transportable envelope which is of a shape selected to resemble a natural object.

* * * * *

UNITED STATES PATENT AND TRADEMARK OFFICE
CERTIFICATE OF CORRECTION

PATENT NO. : 5,250,946

DATED : October 5, 1993

INVENTOR(S) : Serge Care Colin et al

It is certified that error appears in the above-identified patent and that said Letters Patent is hereby corrected as shown below:

On title page, item [75] Inventor:
 before "Daniel Stanzcyk, insert -- Serge Care Colin,
 Abry, France, Philippe Mansuy, Genas, France, Robert Marcellier,
 Bischoffsheim, France, and--

Signed and Sealed this

Third Day of May, 1994

Attest:

BRUCE LEHMAN

*Attesting Officer*   *Commissioner of Patents and Trademarks*